United States Patent
Paulraj et al.

(10) Patent No.: US 6,981,099 B2
(45) Date of Patent: Dec. 27, 2005

(54) SMART-PREFETCH

(75) Inventors: Dominic A. Paulraj, Sunnyvale, CA (US); Sanjay Goil, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 255 days.

(21) Appl. No.: 10/320,284

(22) Filed: Dec. 16, 2002

(65) Prior Publication Data

US 2004/0117557 A1  Jun. 17, 2004

(51) Int. Cl.[7] .............................................. G06F 12/00
(52) U.S. Cl. ................................... 711/137; 711/113
(58) Field of Search ........................ 711/137, 113, 711/123, 125, 126

(56) References Cited

U.S. PATENT DOCUMENTS

| | | | | |
|---|---|---|---|---|
| 5,854,934 A | * | 12/1998 | Hsu et al. | 717/161 |
| 5,941,981 A | * | 8/1999 | Tran | 712/207 |
| 5,964,867 A | | 10/1999 | Anderson et al. | 712/219 |
| 6,081,868 A | * | 6/2000 | Brooks | 711/3 |
| 6,119,203 A | | 9/2000 | Snyder et al. | 711/137 |

FOREIGN PATENT DOCUMENTS

| | | | | |
|---|---|---|---|---|
| WO | WO 98/06041 | | 2/1998 | G06F/15/00 |
| WO | WO 00/73897 A1 | | 12/2000 | G06F/9/38 |
| WO | WO 2004/055667 A3 | | 7/2004 | G06F/9/38 |

OTHER PUBLICATIONS

Chi et al. "Compiler Driven Data Cache Prefetching for High Performance Computers," Proceedings of TENCON'94—IEEE Region 10's 9th Annual International Conference on "Frontiers of Computer Technology", Singapore, Aug. 1994, pp. 274–278.*

* cited by examiner

Primary Examiner—Pierre-Michel Bataille
Assistant Examiner—Sheng-Jen Tsai
(74) Attorney, Agent, or Firm—Hamilton & Terrile, LLP; Stephen A. Terrile

(57) ABSTRACT

A method and system for the smart prefetching of instructions is disclosed. The method includes computing an effective memory latency of a request for data and using the effective memory latency to compute an effective address from which to prefetch data.

26 Claims, 5 Drawing Sheets

SMART-PREFETCH

BACKGROUND OF THE INVENTION

1. Field of the Invention

The present invention relates generally to computer architecture, and more specifically, to a method and system for prefetching.

2. Description of the Related Art

Computer program instructions generally involve operations internal to a processor (e.g., a register to register load) and external to the processor (e.g., fetching data from memory). Operations internal to the processor are controlled more by processor clock frequencies, while operations external to the processor are controlled more by other clock frequencies (e.g., bus frequencies, and/or memory frequencies). Unfortunately, because memory performance has not kept pace with increases in processor clock frequencies, the time taken to access memory has become a bottleneck to efficient program execution.

One method which has been developed to increase the speed and efficiency at which computer programs execute is "prefetching." Prefetching involves the fetching (usually from lower levels in a memory hierarchy (e.g., main memory or memory on disk) into cache memory) of data not yet accessed by the processor with the expectation that the processor will eventually do so and will be better able to use the prefetched data. For example, anticipating that an instruction may require certain data from main memory, the data is prefetched from main memory and stored in a cache or a buffer local to the the data is prefetched from main memory and stored in a cache or a buffer local to the processor. This way, the data is likely accessible in the cache when the instruction is executed. By anticipating processor access patterns, prefetching helps to reduce cache miss rates. Prefetching is contrasted with on-demand implementations in which the cache fetches data as the data is requested by the processor.

The effectiveness of prefetching is limited by the ability of a particular prefetching method to predict the addresses from which the processor will need to access data. Successful prefetching methods typically seek to take advantage of patterns in memory accesses by observing all, or a particular subset of, memory transactions and prefetching unaccessed data for anticipated memory accesses.

Prefetching may be implemented with hardware techniques, software techniques, or a combination of both. Hardware techniques such as stream buffer prediction and load stride prediction are common hardware prefetch implementations. Stream buffer prediction generally involves fetching multiple blocks of memory consecutive to a given processor requested memory block, on the theory that the data in the "extra" consecutive blocks will eventually be needed. Alternatively, with load stride prediction, the hardware may observe processor memory accesses and look for patterns upon which to base predictions of address from which the processor will need data. Software techniques of implementing prefetching involve identifying instructions within a computer program which would benefit from prefetching, and scheduling prefetches to data elements used at a later stage of execution.

One prefetching technique commonly used is N-ahead prefetching. With N-ahead prefetching, each fetch prefetches one or more cache lines a given distance (i.e., an ahead distance) from the current load address. Generally, the ahead distance (N) depends on the memory latency of the computer on which a program is executing. If the memory latency of a given computer is small, then the delay associated with retrieving data from memory is small, and consequently, the ahead distance is small. However, if the memory latency is large, the penalty for having to fetch data from main memory is increased. Consequently, the ahead distance is large for large memory latencies. Unfortunately, the memory latency used by such methods are often hard-coded into programs and compiled for each system on which the programs are to be executed.

In order to account for memory latency when scheduling prefetching (i.e., in order to compute the best ahead distance N), a compiler factors in the memory latency of the system on which the code is to execute. However, this involves hard-coding the memory latency in the program and compiling the code for each different computer system the code is to execute on. Unfortunately, this proves to be inefficient, and is not available for computer systems with unknown memory latencies (e.g., computer systems in production or not yet developed).

Many problems may result if the compiler assumed latency does not match the actual memory latency of the computer system on which the code is executed. For example, if the actual computer system memory latency is larger than the memory latency assumed by the compiler, prefetched data may not be loaded into the cache when the corresponding load instruction is issued. This can trigger a duplicate memory request for the same cache line. Issuing such duplicate requests for the same cache line reduces the total available bandwidth. Further, additional pending requests stored in a buffer (e.g., in a load miss buffer) may cause the processor to stall once the buffer becomes full.

If, on the other hand, the actual computer system memory latency is smaller than the memory latency assumed by the compiler, the load instruction corresponding to data placed in cache is issued much later than when the data is available in cache. Because the cache line may be replaced between the time the data is loaded in the cache and when the load issues, the cached data may become unavailable when needed.

Multi-processor systems containing multiple memory and/or processor boards also pose problems for existing prefetching processes. For example, typical memory implementations of multi-processor systems do not distinguish the memory on different boards. It is possible for a thread to be executing on a first board, yet accessing memory on a second board. Because the memory latency associated with the boards may differ, the aforementioned memory latency problems may occur. Similar problems result for systems which include memory allocated both on a local memory board and on a remote board.

SUMMARY OF THE INVENTION

In one embodiment of the present invention, a method of smart-prefetching data is disclosed. The method includes computing an effective memory latency of a request for data and using the effective memory latency to compute an effective address from which to prefetch data.

In another embodiment of the present invention, a system disclosed. The system includes a processor having a smart-prefetch unit configured to use a run-time memory latency to compute an effective address from which to prefetch data.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention utilizes a combination of hardware and software to provide smart-prefetching, preferably decreasing the execution time of computer programs, and providing for more efficient program execution in general. As used herein, smart-prefetching is the process of generating a smart-prefetch instruction (defined below), using the smart-prefetch instruction along with run-time computed parameters (e.g., a run-time computed value of an effective memory latency and a memory stride) to compute an effective address, and prefetching data from the computed effective address. In accordance with one embodiment of the present invention, software is configured to identify instructions in a computer program which would benefit from prefetching, and generate one or more smart-prefetch instructions (in the resulting executable). Hardware, configured to operate on the smart-prefetch instructions, dynamically modifies an ahead distance, among other parameters, of the smart-prefetch instruction(s) using information (e.g., a memory latency and memory stride) obtained during runtime, and uses the ahead distance to calculate an effective address from which to prefetch data. By determining an effective address based on run time obtained information, a more efficient prefetching technique is provided that preferably improves execution time. Additionally, previous inefficiencies of compilation, such as loop unrolling, are obviated, and re-compilation of data with hardcoded values such as an ahead distance based on a static memory latency times is not necessary.

Software Architecture

Figure 1:
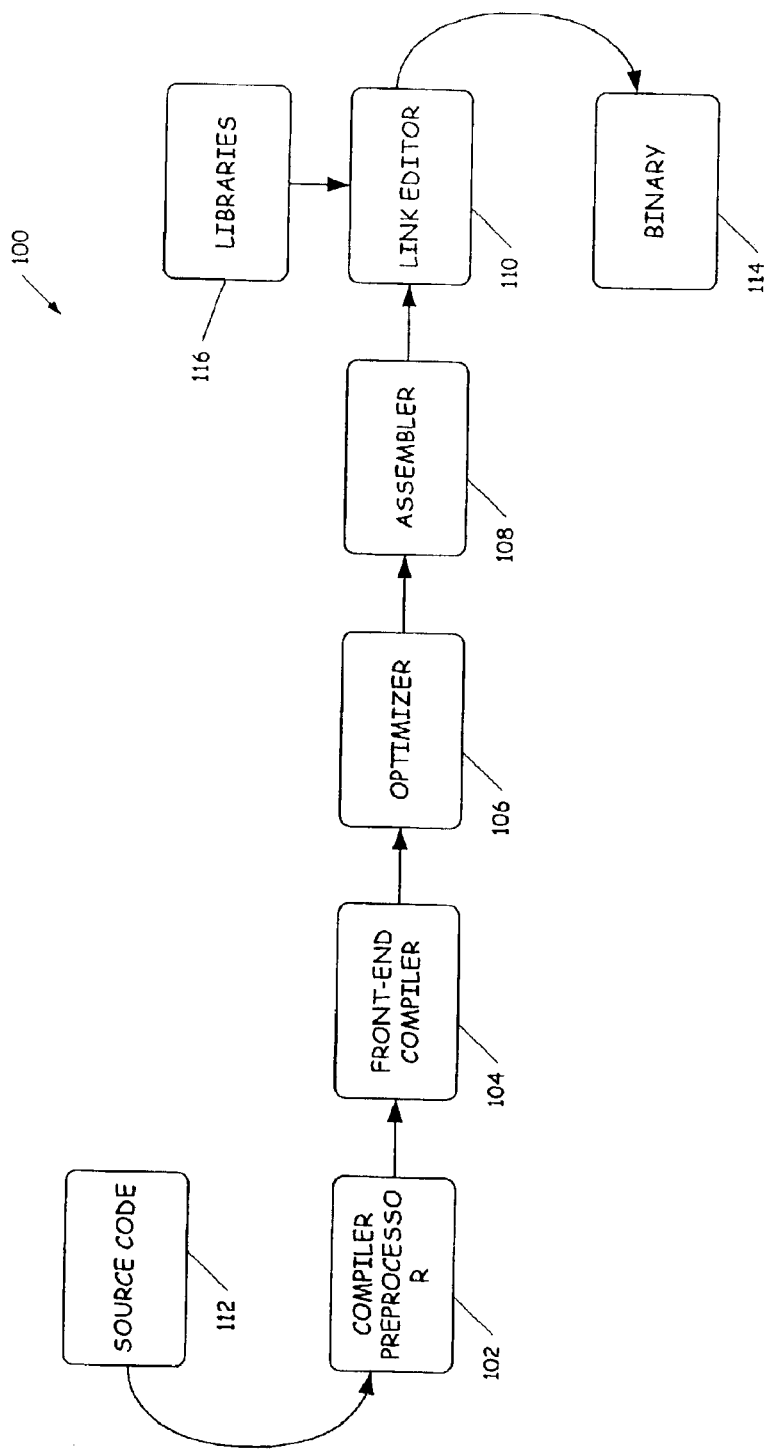
FIG. 1 is a block diagram of a compiler according to the present invention.

FIG. 1 is a block diagram of a compiler 100 according to one embodiment of the present invention. Compiler 100 is preferably configured to identify data in a computer program that would benefit from prefetching and generate one or more smart-prefetch instructions for the data. Compiler 100 includes a compiler preprocessor 102, a front-end compiler 104, an optimizer 106, an assembler 108, and a link editor 110.

Preprocessor 102 performs such tasks as replacing #define statements in a program file 112 with token strings and/or carrying out directives included in header files associated program file 112. Front-end compiler 104 translates the high-level language code (e.g., C, C++, Java, or other high-level language) of program file 112 into an intermediate representation. Optimizer 106 operates on an intermediate representation of program file 112 to provide for a more efficient compilation and program execution.

Assembler 108 translates assembly language code into machine instructions of a computer system on which program file 112 is executed. Generally the machine instructions are stored in one or more object files, such as object file 114, which are binary representations of program file 112. Link editor 110 links one or more libraries 116 with one or more object files to produce object file 114. Library 116 is a collection of object files each of which contain code for commonly used functions called in program file 112. Many alternative compiler architectures are suitable, and based on the description herein, those of skill in the art will appreciate suitable modifications to the exemplary embodiments described herein.

Figure 2:
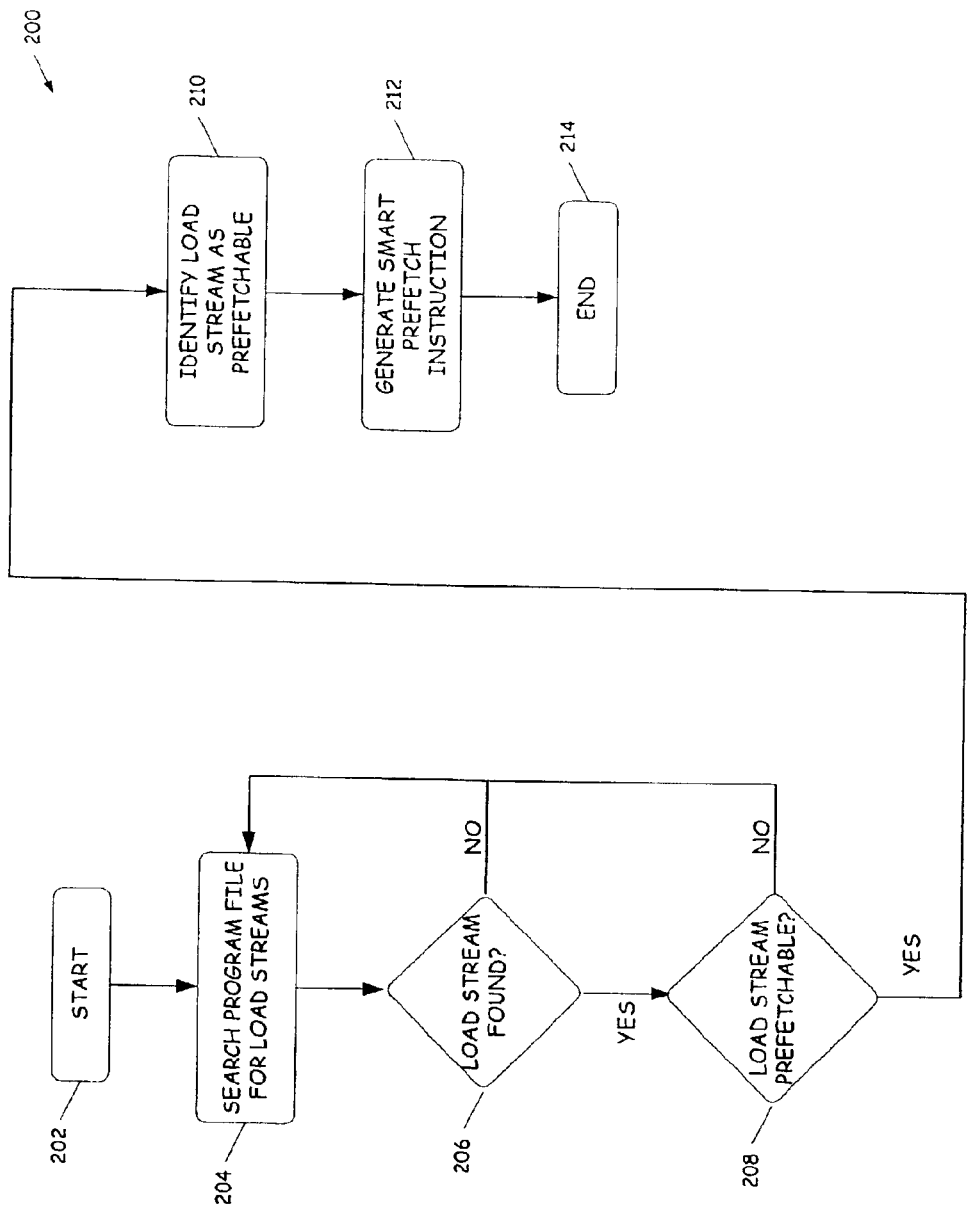
FIG. 2 is a flow chart illustrating generally the actions performed by a compiler in generating smart-prefetch instructions in accordance with the present invention.

FIG. 2 is a flow chart 200 illustrating a process performed by compiler 100 in generating smart-prefetch instructions in accordance with one embodiment of the present invention. Initially, compiler 100 searches a program file (program file 112, for example) for code which would benefit from prefetching (step 204). One type of code which benefits from prefetching, discussed here as an example and not intended to limit the present invention, are load streams. As used herein, load streams identify memory addresses, one or more of which are accessed by a sequence of memory reads or writes at preferably intervals, dynamically determined, separating the memory addresses. For example, a load stream may result from "walking" through a matrix in row- or column-order using a loop to iteratively access the data. The distance between elements in the load stream is commonly referred to as the memory stride. Often times, the memory stride is run-time dependent. For example, given one set of conditions, resolvable at run-time, every element of a 100 element matrix may be accessed during each iteration of a loop (resulting in a memory stride of 8, assuming each element is 8 bytes), and given another set of conditions, resolvable at run-time, every tenth element of the matrix may be accessed during each iteration of the loop (resulting in a memory stride of 80, assuming each element is 8 bytes). It is thus desirable to provide a prefetching scheme which is able to take the run-time determined memory stride into account.

If a load stream is found, and the load stream is prefetchable, compiler 100 identifies the load stream as prefetchable ("YES" branches of decision blocks 206 and 208, and step 210). If however, no load stream is located, or the load stream is not prefetchable, compiler 100 returns to step 204 to continue searching the program file for code which would benefit from prefetching ("NO" branches of decision blocks 206 and 208). It will be recognized that many commonly known methods may be used to determine whether data is deemed prefetchable. Whether the data is part of a loop and/or the spatial location of the data in memory are two common examples of techniques to determine whether code would benefit from prefetching.

Following the identification of the load stream as prefetchable, compiler 100 generates a smart-prefetch instruction for the load stream (step 212). In one embodiment of the present invention, the syntax of the smart-prefetch instruction has the following form:

ld [% l 1] ASI_PREFETCH, % g1

This syntax, ld [% l1] ASI_PREFETCH, % g1, defines a smart-prefetchable load instruction having parameters % l1, ASI_PREFETCH, and % g1. % l1 represents the beginning address of the load stream, ASI_PREFETCH represents an Alternate Space Identifier for the smart-prefetch instruction, and % g1 represents a register to which the data is loaded. In accordance with the present invention, the purpose of the smart-prefetch instruction is to provide a "hint" to hardware (e.g., a processor executing the smart-prefetchable instruction) that certain data is likely to be needed in the future by the program being executed. In place of ASI_PREFETCH, any parameter (e.g., a bit in an existing load instruction, etc.) may be used to provide the hint to the hardware that a load stream is to be prefetched. By "hint" what is meant is that the smart-prefetch instruction is not a prefetch instruction per say, but a load instruction which indicates to the hardware a candidate load stream which may be prefetchable. The hardware can initiate an attempt to prefetch data at an earlier stage (i.e., issue one or more prefetches) so that when the data is actually needed, it will be available more quickly. As will be described in greater detail below, the hardware determines a distance ahead (of a current load instruction) from which to prefetch data based upon a run-time obtained memory stride and memory latency. This method and system provides an optimum data stride length for efficiently prefetching data.

The flow diagrams illustrated herein describe a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. It will be recognized that one or more of the steps may be performed in serial or parallel fashion. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Hardware Architecture

Figure 3:
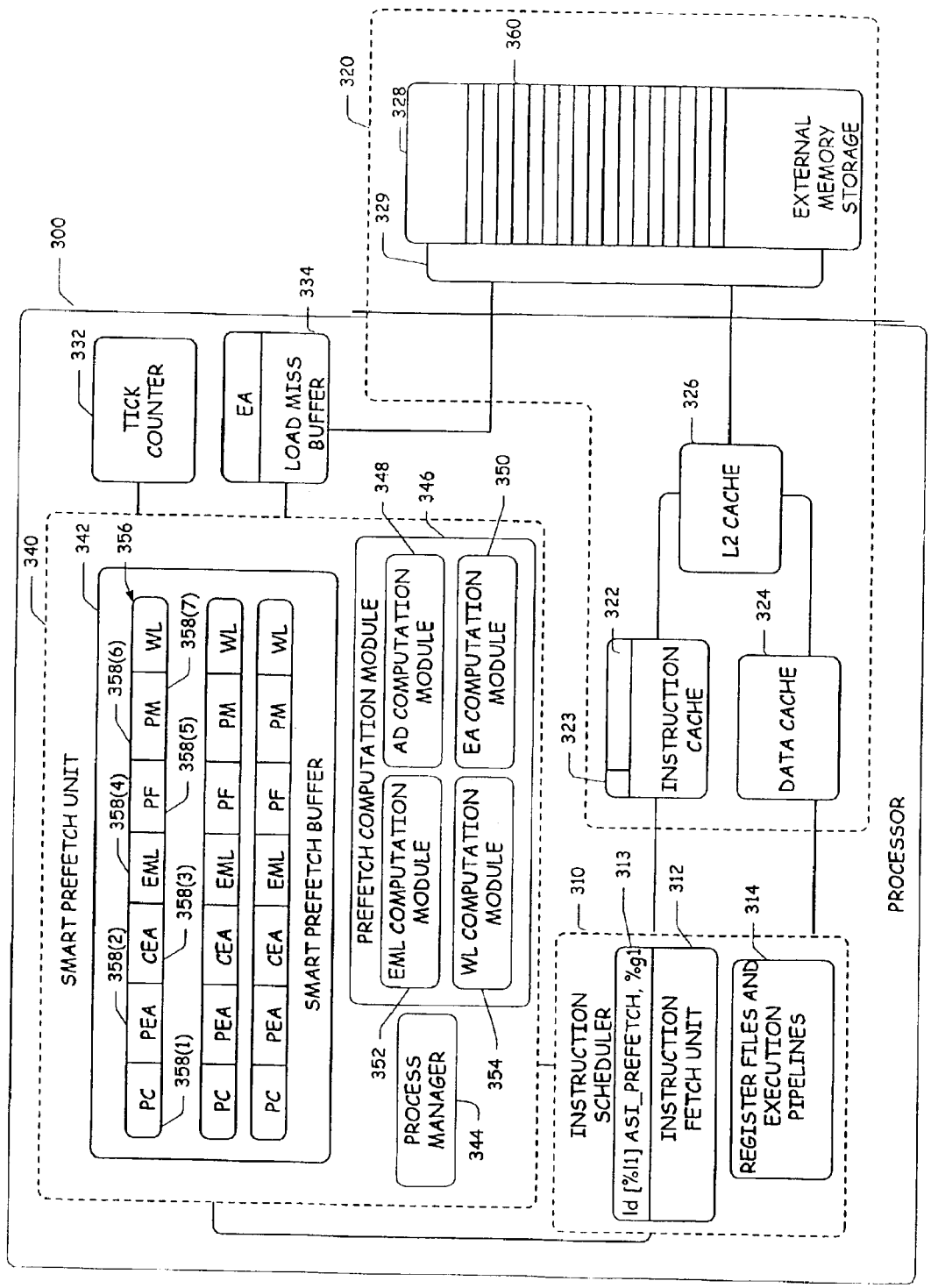
FIG. 3 is a block diagram of a computer system including a smart-prefetch system according to the present invention.

FIG. 3 depicts a processor 300 including a smart-prefetch feature in accordance with one embodiment of the present invention. Processor 300 (which may be a single or multi-processor) includes an instruction scheduler 310 which illustratively includes an instruction fetch unit 312 and execution pipelines 314 which load data from and store data to a memory hierarchy 320. For aiding in the description of the present embodiment, instruction fetch unit 312 is illustrated as including, and executing, smart-prefetch instruction 313 having been loaded from, for example, memory hierarchy 320.

In the presently described embodiment of FIG. 3, memory hierarchy 320 is defined by an instruction cache memory 322 having a data bit 323, a data cache memory 324, a L2 cache 326, and an external memory storage 328 having a memory interface 329 (for aiding in the description of the presently described embodiment, external memory storage 328 is illustrated as including a load stream beginning at address 360). It will be recognized that external memory storage 328 represents one or a combination of a main memory, a hard disk, a diskette, a CD-ROM, an external storage device, and/or a network storage device. Additionally, many alternative memory hierarchies are suitable, and based on the description herein, those of skill in the art will appreciate suitable modifications to the exemplary smart-prefetch implementations. Instruction cache memory 322, data cache memory 324, and L2 cache 326 are of any suitable design, including, e.g., separate on-chip first-level caches and a unified off-chip second-level cache, on-chip first- and second-level caches and an external third-level cache, etc. In addition, the caches can be non-blocking, i.e., responsive to cache hits while processing outstanding cache misses, or blocking, and can be direct-mapped, fully-associative, set associative, etc.

In one embodiment, processor 300 also includes a tick counter 332, a load miss buffer 334, and a smart-prefetch unit 340. Smart-prefetch unit 340 includes a smart-prefetch buffer 342, a process manager 344 and a smart-prefetch computation module 346. Smart-prefetch computation module 346 includes an ahead distance (AD) computation module 348, an effective address (EA) computation module 350, an effective memory latency (EML) computation module 352, and a work in the loop (WL) computation module 354.

Smart-prefetch unit 340 is configured to generate one or more smart-prefetch requests 356 from a smart-prefetch instruction (e.g., smart-prefetch instruction 313). Smart-prefetch requests 356 are preferably stored in smart-prefetch buffer 342. In one embodiment, smart-prefetch buffer 342 is a buffer implemented on processor 300. However, in other embodiments of the present invention, smart-prefetch buffer 342 may be any memory storage medium (e.g., cache, nonvolatile flash, etc.) and associated circuitry located on or off of processor 300. Also, in one embodiment of the present invention, smart-prefetch buffer 342 operates as a cache, caching multiple smart-prefetch requests via commonly known caching methods (e.g., FIFO, LIFO, lowest PC, highest PC, LRU, random, etc).

Each smart-prefetch request 356 preferably includes a number of fields 358, including a Program Counter (PC) 358(1), a Previous Effective Address (PEA) 358(2), a Current Effective Address (CEA) 358(3), a Effective Memory Latency (EML) 358(4), a Prefetch Frequency (PF) 358(5), a Prefetch Monitor (PM) 358(6), and a Work in the Loop (WL) 358(7).

Figure 4:
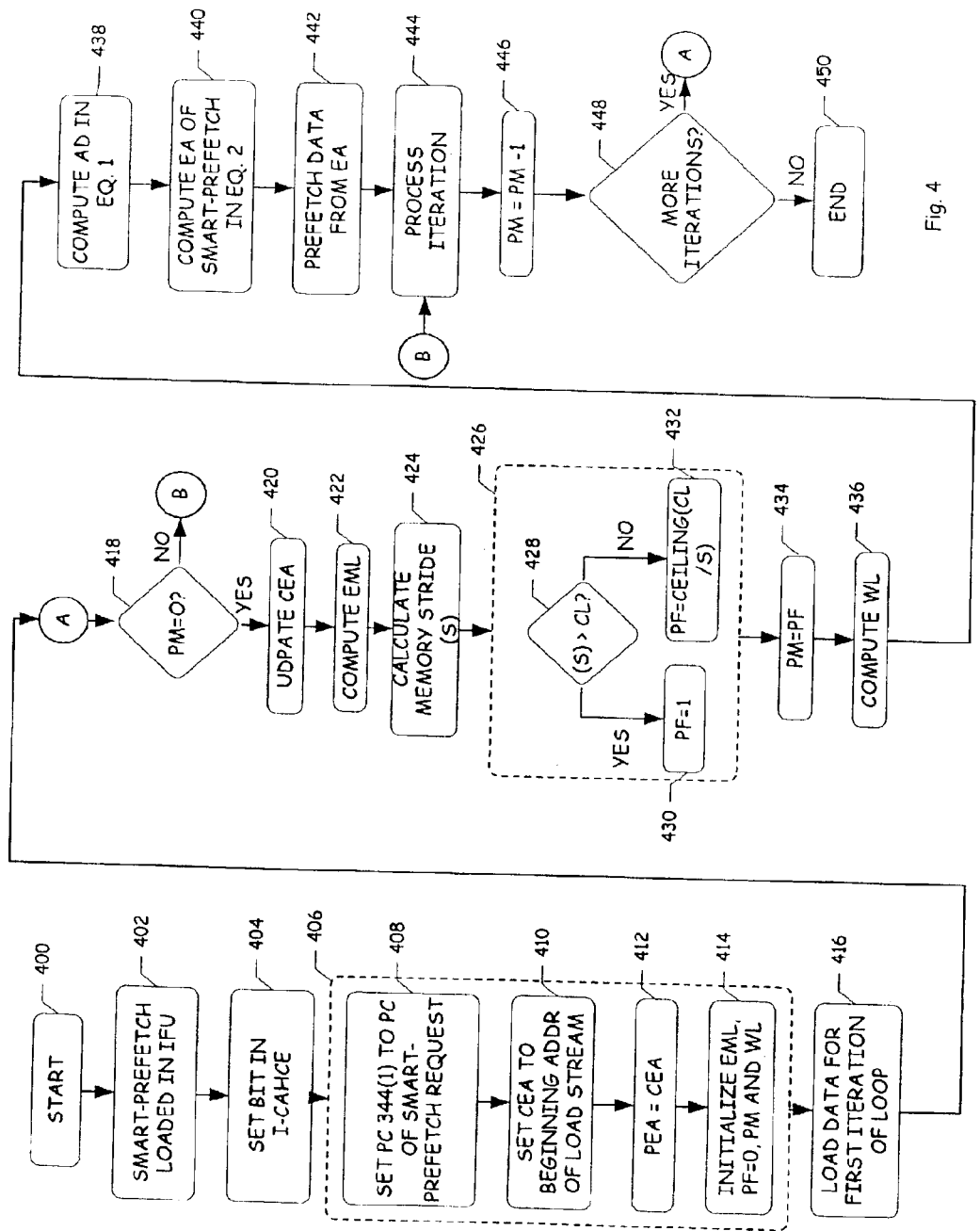
FIG. 4 is a flow chart illustrating a process performed by a smart-prefetch system according to the present invention.

Process manager 344 is configured to process the overall operation of computing the effective address for a smart-prefetch instruction (as described in FIG. 4). Prefetch computation module 346 is configured to compute parameters for calculating the effective address of the smart-prefetch instruction from which data may be prefetched, in accordance with the present invention. EML computation module 352 is configured to compute the effective memory latency of the system on which processor 300 is configured to execute instructions. The effective memory latency (EML) is calculated at run time as the time interval between a memory request for data and the arrival of the data at processor 300.

WL computation module 354 is configured to compute the work in the loop (WL). WL is computed as the time between two consecutive occurrences of a prefetchable load at the same program counter. In one embodiment of the present invention, the time is measured by processor 300 (e.g., via tick counter 332). AD computation module 348 is configured to compute the ahead distance (AD) for the smart-prefetch instruction. AD is computed as the ratio of the effective memory latency to the work in the loop, expressed mathematically in equation 1 as:

$$AD = \frac{EML}{WL} \qquad (\text{Eq. 1})$$

Upon the computation of each value (e.g., EML and WL), the respective computation module (e.g., EML computation module 352 and WL computation module 354) is configured to update the corresponding fields (e.g., 358(4) and 358(7)) of the specific smart-prefetch request 356.

EA computation module 350 is configured to calculate the effective address from which data is to be prefetched, using, inter alia, information in smart-prefetch request 356. The effective address (EA) of the smart-prefetch is calculated as the sum of the current effective address with the product of the ahead distance and the cache line size (CL), expressed mathematically in equation 2 as:

$$EA = (CEA + (AD*CL)) \qquad (\text{Eq. 2})$$

The current effective address represents an address of data for a load by processor 300. Along with, or in place of, the load of data from the current effective address, data may be prefetched a given distance (e.g., AD*CL) from the current address. The computed EA is preferably stored in load miss buffer 334. Because EA is computed using run-time obtained values of memory stride and memory latency, the prefetching efficiency (e.g., the amount of data loaded on a cache line during a prefetch which satisfies subsequent cache requests) of processor 300 is preferably improved.

Regarding the interconnections of the components of FIG. 3, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, it is to be understood that such depicted architecture is exemplary in nature, and that in fact many other architectures can be implemented which achieve the same functionality. Any arrangement of components to achieve the same functionality is effectively "associated" such that the desired functionality is achieved. Hence, any number of components herein combined to achieve a particular functionality can be seen as "associated with" each other such that the desired functionality is achieved, irrespective of architectures or intermediate components. Likewise, any number of components so associated can also be viewed as being "operably connected", or "operably coupled", to each other to achieve the desired functionality.

Operation

FIG. 4 is a flow chart illustrating actions performed by hardware (e.g., processor 300) in accordance with an embodiment of the present invention. As will be seen, embodiments of the present invention are useful for, at least, preferably decreasing the overall execution time of a program and/or improving the overall efficiency of program execution.

As an aid to understanding the present invention, and in no way intending to limit the present invention, the operations of one embodiment of the present invention are described with reference to the pseudo-code segment below. It will be recognized that multiple methods exist for defining and accessing load streams, and that the pseudo-code below is provided only for exemplary purposes.

```
if (Increase_Length = = true)
    Length = 10
else
    Length = 1
for i = 1 to 100
    Matrix_1[i] = Matrix_2[i * Length]
```

The pseudo-code segment above defines a loop of 100 iterations to transfer data from Matrix_2 (a load stream beginning at address 360 of FIG. 3) to Matrix_1. In accordance with the present embodiment, compiler 100 will recognize that the load stream of Martix_2 and will generate a smart-prefetch instruction for the data. Hardware configured to recognized the smart-prefetch instruction will use run-time obtained information to compute an effective address from which to prefetch data. As seen from the above pseudo-code, depending on the value of Increase_Length, Matrix_1 stores either consecutive values of Matrix_2, or every tenth value of Matrix_2. Thus, the memory stride of the load stream to be accessed in the loop is not known until run-time (i.e., the memory stride depends on the value of Increase_Length which, in the presently described embodiment, is not known until run-time). As described below, embodiments of the present invention provide a system and method for efficiently prefetching data based upon the run-time determined value of the memory stride and the memory latency.

Referring now to the flowchart illustrated in FIG. 4, smart-prefetch instruction 313 is loaded in instruction fetch unit 312 (step 402). It will be recognized that well known methods exist for loading an instruction such as smart-prefetch instruction 313 into such items as an instruction fetch unit 312. In the presently described embodiment, smart-prefetch instruction 313 is generated, for example, from compiler 100 operating on the program code represented by the pseudo-code above. Smart-prefetch instruction 313 provides a hint to processor 300 that certain data (e.g., data in Matrix_2) is likely to be needed in the future, and is preferably prefetchable. It is assumed for purposes of describing the present embodiment, that the load stream to be accessed is not presently cached (e.g., not in L2 cache 326) and must be loaded from other memory (e.g., external memory storage 328).

At or near the time smart-prefetch instruction 313 is loaded into instruction fetch unit 312, processor 300 sets bit 323 in instruction cache 322 to indicate that the program counter associated with smart-prefetch instruction 313 is associated with a prefetch-load (step 404). In one embodiment of the present invention, there exists a bit 323 for each smart-prefetch instruction 313 present in instruction cache 322. Next, processor 300 creates a smart prefetch request 356 in smart-prefetch buffer 342 and initializes various fields of smart prefetch request 356 (step 406).

In providing smart-prefetch request 356 in smart-prefetch buffer 342, processor 300 sets PC 358(1) equal to the program counter of smart-prefetch instruction 313 (step 408). Processor 300 also sets CEA 358(3) equal to the beginning effective address of the load stream to be processed by smart-prefetch instruction 313, or address 350 in the presently described embodiment (step 410). For the first iteration of the loop to access data in the load stream, PEA 358(2) is set to the value of CEA 358(3) (step 412). EML 358(4) is preferably initialized to an estimated average value of memory latency for the system (e.g., 300 cycles), PF 358(5) is initialized to 1, and WL 358(7) is initialized to 0. PM is 358(6) initialized to the value in PF 358(5) (step 414). Following initialization, the first iteration of the loop is executed (step 416).

Upon completion of execution of one or more iterations of the loop, processor 300 updates smart-prefetch request 356. Before updating the fields of smart-instruction 356 however, the value of Prefetch Monitor (PM) 358(6) is evaluated (as described below, PM 358(6) is evaluated because it may not be necessary to update all of the fields of smart-prefetch request 342 on each iteration, of the loop). If PM 358(6) is not zero (indicating that more iterations of the loop are preferably to be processed before a smart-prefetch is to be issued), execution proceeds to reference step (B) ("NO" branch of decision block 418). If, however, PM 358(6) is zero, the fields of smart-prefetch request 356 are updated in preparation for issuance of a smart-prefetch ("YES" branch of decision block 418).

In updating fields 358, Current Effective Address (CEA) 358(3) is updated to point to the next effective address to be processed in the next iteration of the loop (step 420). In one embodiment of the present invention, the next effective address to be processed in the next iteration of the loop is automatically determined by the hardware of the system. Effective Memory Latency (EML) 358(4) is updated with the run-time measured effective memory latency as measured by tick counter 332 (step 422). The effective memory latency is calculated at run time as the time interval between a memory request and data arrival by processor 300. A memory stride (S) is calculated as the difference between CEA 358(3) and Previous Effective Address (PEA) 358(2) (notice that memory stride (S) represents the run-time value of the memory stride) (step 424).

Prefetch Frequency (PF) 358(5) is set to the number of iterations which should be preferably completed before the next prefetch is to be issued (step 426). The value of PF 358(5) depends on the memory stride (S). If the memory stride is greater than the cache line size of the system, then PF 358(5) is set to 1 ("YES" branch of decision block 428, and step 430). If, however, the memory stride is not greater than the cache line size, then PF 358(5) is set to the value of the cache line size divided by the memory stride ("NO" branch of decision block 428, and step 432). In one embodiment of the present invention, this calculation is performed by Ceiling (cache line size(CL)/memory stride (S)), where Ceiling represents a function which rounds a number with a set precision. It can be seen that, PF 358(5) reflects the fact that, depending on the memory stride, a cache line may bring in enough data to satisfy multiple iterations, and it may not be necessary to prefetch (e.g., another cache line) after every iteration, but rather after the number of iterations have exhausted the data prefetchable on a cache line. PM 358(6), the prefetch monitor, is set to PF 358(5) (step 434). As described above, PM 358(6) is used to count the number of iterations preferably completed before a smart-prefetch is to be issued. It will be recognized that PF 358(5) and PM 358(6) may be represented by a single field rather than two fields.

Work in the Loop (WL) 358(7) is calculated as the time spent between two consecutive smart-prefetchable loads executed for the same smart-prefetch request 356 (step 436). In one embodiment of the present invention, the time is measured by processor 300 (e.g., via tick counter 332). The Ahead Distance (AD) for the smart-prefetch is computed according to equation 1, described above, (step 438). Using AD and CEA, the effective address (EA) of the smart-prefetch is computed using equation 2, described above (step 440). The computed EA is preferably stored in load miss buffer 334. Because EA is computed using run-time obtained values of memory stride and memory latency, the prefetching efficiency (e.g., the amount of data loaded on a cache line during a prefetch which is satisfies subsequent cache requests) of processor 300 is preferably improved.

When the smart-prefetch is issued, as determined by processor 300, data beginning at EA (address 360 in the presently described embodiment) is loaded from external memory storage 328 to areas of memory closer to processor 300 (e.g., L2 cache 326) (step 442). In one embodiment of the present invention, the ahead distance from which data is prefetched corresponds to a multiple of the cache line size of the system.

Following each iteration, PM 358(6) is decremented by 1 (step 446). The utilization of program monitor PM 358(6) is used to account for the fact that one prefetch may satisfy the data required by a number of iterations of the loop. Thus, it would not be necessary to issue a prefetch following each iteration (because such a prefetch may possibly be a duplication of a prefetch request for the same cache line, but rather only when the prefetched data has been exhausted (e.g., is no longer able to satisfy data requests from the cache). If no more iterations are to be processed, then processing of the steps ends ("NO" branch of decision block 448 and step 450). If, however, more iterations are to be processed, execution continues at reference (A) ("YES" branch of decision block 448).

Figure 5:
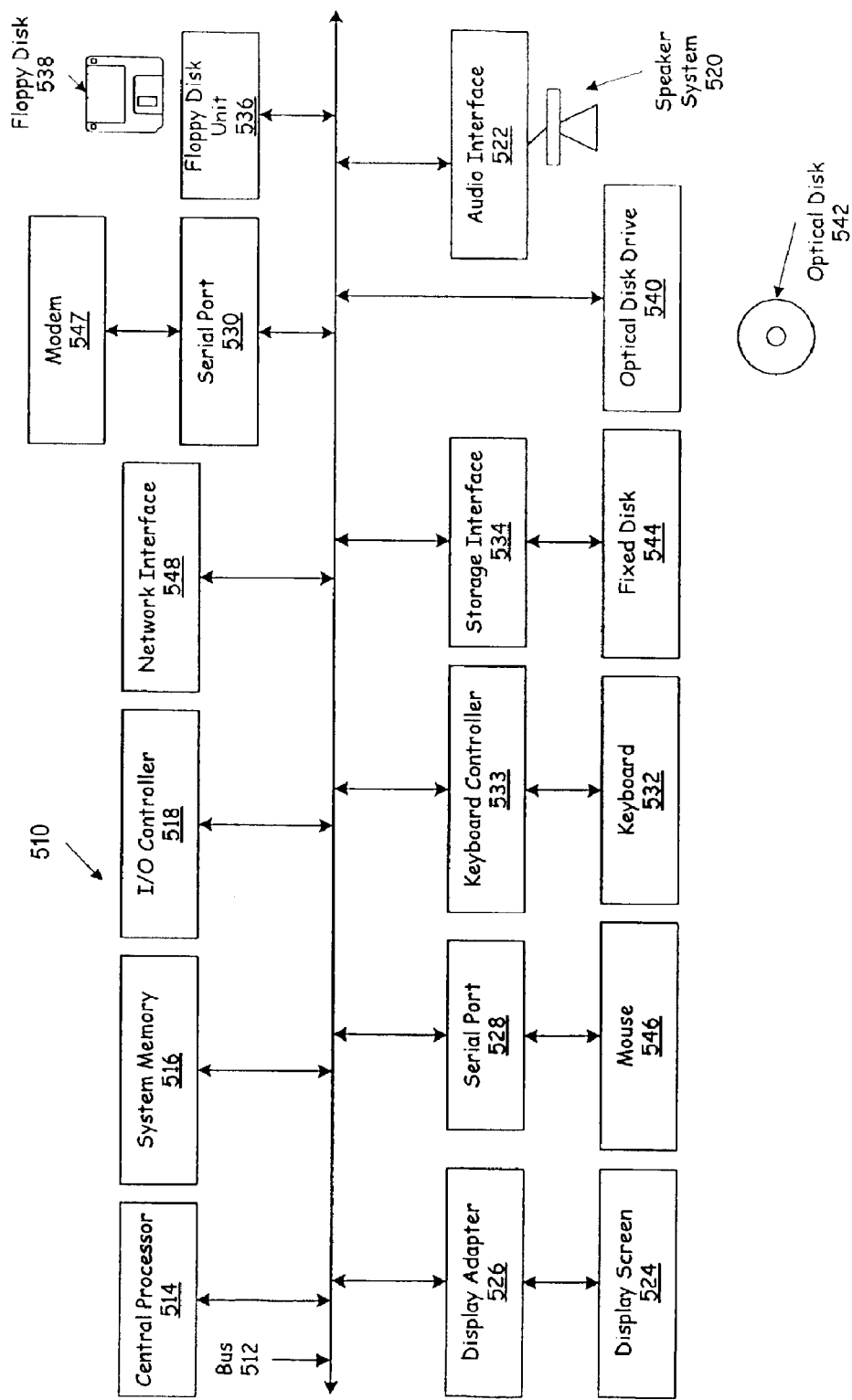
FIG. 5 is a block diagram illustrating a computer system suitable for implementing embodiments of the present invention.

FIG. 5 depicts a block diagram of a computer system 510 suitable for implementing the present invention. Computer system 510 includes a system interconnect 512 which interconnects major subsystems of computer system 510 such as one or more central processor(s) 514, system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a computer readable media 542 (e.g., a CD-ROM). Also included are a mouse 546 (or other point-and-click device, coupled to system interconnect 512 via serial port 528), a modem 547 (coupled to system interconnect 512 via serial port 530) and a network interface 548 (coupled directly to system interconnect 512).

System interconnect 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Many other devices can be connected such as a mouse 546 connected to system interconnect 512 via serial port 528, a modem 547 connected to system interconnect 512 via serial port 530 and a network interface 548 connected directly to system interconnect 512. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliance, X-window terminal or other such computing device. The operating system provided on computer system 510 may be Solaris®, UNIX®, Linux® or other known operating system. Computer system 510 also supports a number of Internet access tools, including, for example, an HTTP-compliant web browser having a Java-Script interpreter, such as Netscape Navigator®, Microsoft Explorer® and the like.

What is claimed is:

1. A method comprising:
   computing an effective memory latency of a system;
   using said effective memory latency to compute an effective address from which to prefetch data; and,
   performing a "work in the loop" (WL) computation to generate a smart prefetch request.

2. The method of claim 1, wherein said computing said effective memory latency is done during the execution of a computer program on said system.

3. The method of claim 2, further comprising:
   notifying a processor of a load stream in memory, wherein said load stream defines data which is prefetchable; and
   providing said processor with an address of said load stream.

4. The method of claim 3 further comprising:
   generating a smart-prefetch instruction for said load stream, wherein said notifying and said providing are accomplished with said smart-prefetch instruction.

5. The method of claim 4, further comprising:
   identifying said load stream in a computer program, the data of said load stream is accessed by a sequence of memory reads at dynamically determined intervals.

6. The method of claim 5, wherein said generating said smart-prefetch instruction comprises:
   generating a load instruction for data in said load stream; and
   including an identifier in said load instruction to notify said processor that said data is prefetchable.

7. The method of claim 4 further comprising:
   during the execution of said computer program, generating the smart-prefetch request from said smart-prefetch instruction; and
   updating said smart prefetch request with said effective memory latency.

8. A method comprising:
   computing an effective memory latency of a system, said computing said effective memory latency is done during the execution of a computer program on said system;
   using said effective memory latency to compute an effective address from which to prefetch data;
   notifying a processor of a load stream in memory, wherein said load stream defines data which is prefetchable;
   providing said processor with an address of said load stream;
   generating a smart-prefetch instruction for said load stream, wherein said notifying and
   said providing are accomplished with said smart-prefetch instruction;
   during the execution of said computer program, generating a smart-prefetch request from said smart-prefetch instruction; and
   updating said smart prefetch request with said effective memory latency;
   computing a time between consecutive requests of data in said load stream to define a "work in the loop" (WL); and
   updating said smart prefetch request with said WL.

9. The method of claim 8, further comprising:
   computing an ahead distance by dividing said effective memory latency by said WL; and
   computing said effective address by adding a current effective address with the product of said ahead distance and a cache line size.

10. The method of claim 9, further comprising:
    updating a load miss buffer with said effective address.

11. The method of claim 3, further comprising:
    computing the distance between address of consecutive requests for data within said load stream to define a memory stride.

12. The method of claim 11, further comprising:
    if the memory stride is greater than a cache line size, issuing a prefetch during every iteration of a loop to access data in said load stream.

13. The method of claim 11, further comprising:
    if the memory stride is less than a cache line size, preventing the issuance of multiple prefetches for the same cache line.

14. The method of claim 1, further comprising:
    prefetching data from said effective address into a buffer; and
    satisfying cache misses using data from said buffer.

15. A system, comprising:
    a memory;
    a processor coupled to said memory, said processor comprising a smart-prefetch unit configured to use a run-time memory latency to compute an effective address from which to prefetch data, said smart-prefetch unit comprising a "work in the loop" (WL) computation module.

16. The system of claim 15, wherein said smart-prefetch unit comprises:
    an effective memory latency computation module configured to compute a time interval between a memory request for data and an arrival of said data by said processor.

17. The system of claim 15, wherein said smart-prefetch unit further comprises:
    an ahead distance computation module.

18. The system of claim 17, wherein said smart-prefetch unit further comprises:
    an ahead distance computation module.

19. The system of claim 18, wherein:
    said effective memory address computation module is configured to compute a time interval between a memory request for data and an arrival of said data by said processor;
    said WL computation module is configured to compute a time between two consecutive prefetches executed for a smart-prefetch request issued by said processor;
    said ahead distance computation module is configured to compute a ratio of said time interval computed by said effective memory address computation module to said time between two consecutive smart-prefetches computed by said work in the loop computation module; and said effective address computation module is configured to sum a current effective address with the product of said ratio and a cache line size.

20. The system of claim 16, said smart-prefetch unit further comprising:
a process module, said process module configured to generate a smart-prefetch request from a smart-prefetch instruction.

21. The system of claim 20, said smart-prefetch unit further comprising:
a prefetch computation module, said prefetch computation module configured to compute said effective address.

22. The system of claim 21, further comprising:
a buffer configured to store a plurality of smart-prefetch requests.

23. A system, comprising:
a memory;
a processor coupled to said memory, said processor comprising a smart-prefetch unit configured to use a run-time memory latency to compute an effective address from which to prefetch data, the smart-prefetch unit including a work in the loop computation module;
means for computing a time interval between a memory request for data and an arrival of said data by said processor;
means for computing a time between two consecutive prefetches executed for a smart-prefetch request issued by said processor;
means for computing a ratio of said time interval computed by said effective memory latency computation module to said time between two consecutive smart-prefetches computed by said work in the loop computation module; and
means for adding a current effective address with the product of said ratio and a cache line size to define an effective address from which to prefetch data.

24. A computer program product encoded in computer readable media, said computer program product comprising:
a first set of instructions, executable on a computer system, configured to generate a smart-prefetch instruction for a load stream of data defined in a computer program, and
a second set of instructions, executable on said computer system, configured to perform a "work in the loop" (WL) computation.

25. The computer program product of claim 24, further comprising:
a third set of instructions, executable on said computer system, configured to identify said load stream in said computer program, the data of said load stream is accessed by a sequence of memory reads at dynamically determined intervals.

26. The computer program product of claim 24, further comprising:
a fourth set of instructions, executable on said computer system, configured to generate a load instruction for data in said load stream; and
a fifth set of instructions, executable on said computer system, configured to include an identifier in said load instruction to notify said processor that said data is prefetchable.

* * * * *